(12) United States Patent
Murakami et al.

(10) Patent No.: US 8,699,008 B2
(45) Date of Patent: Apr. 15, 2014

(54) DISTANCE MEASURING DEVICE

(75) Inventors: Kenichi Murakami, Osaka (JP);
Yusuke Hashimoto, Neyagawa (JP)

(73) Assignee: Panasonic Corporation, Kadoma-shi (JP)

( * ) Notice: Subject to any disclaimer, the term of this patent is extended or adjusted under 35 U.S.C. 154(b) by 200 days.

(21) Appl. No.: 13/203,570

(22) PCT Filed: Feb. 26, 2010

(86) PCT No.: PCT/JP2010/053120
§ 371 (c)(1),
(2), (4) Date: Nov. 4, 2011

(87) PCT Pub. No.: WO2010/098454
PCT Pub. Date: Sep. 2, 2010

(65) Prior Publication Data
US 2012/0050716 A1 Mar. 1, 2012

(30) Foreign Application Priority Data
Feb. 27, 2009 (JP) ................................ 2009-046977

(51) Int. Cl.
*G01C 3/08* (2006.01)
(52) U.S. Cl.
USPC ..................... 356/4.01; 356/3.01; 356/5.01
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS 5,329,467 A 7/1994 Nagamune et al.
6,219,596 B1 * 4/2001 Fukae et al. .................... 701/23

(Continued)

FOREIGN PATENT DOCUMENTS

JP 07-325153 A 12/1995
JP 08-304541 A 11/1996

(Continued)

OTHER PUBLICATIONS

International Search Report dated Apr. 13, 2010, issued for PCT/JP2010/053120.

(Continued)

*Primary Examiner* — Luke Ratcliffe
(74) *Attorney, Agent, or Firm* — Edwards Wildman Palmer LLP

(57) ABSTRACT

The distance measuring device includes a light source (1), a light-receiving sensor (2), a timing controller (5), a distance calculator (6), and a delay controller (8). The timing controller (5) outputs a modulation signal and plural reference timing signals. The modulation signal is a square wave signal having high and low level periods appearing alternately. Each of the high and low level periods has its length randomly selected from integral multiples of a predetermined unit time period. The reference timing signals include a signal having the same waveform as that of the modulation signal and a signal having the same waveform as that of the inverted modulation signal. The light source (1) varies an intensity of the light in concordance with the modulation signal. The delay controller (8) delays the plural reference timing signals by the delay period (Td) to create plural timing signals respectively. The light-receiving sensor (2) accumulates the electric charges generated within the reception time period, with regard to each of the timing signals. The distance calculator (6) calculates the time difference ($\tau$) from amounts of the electric charges respectively associated with the timing signals, and calculates a distance (L) to the target (3) on the basis of the time difference ($\tau$) and the delay period (Td).

12 Claims, 5 Drawing Sheets

(56) References Cited

U.S. PATENT DOCUMENTS

2004/0135992 A1* 7/2004 Munro .................. 356/4.01
2005/0178946 A1 8/2005 Hashimoto et al.
2009/0045359 A1* 2/2009 Kumahara et al. ....... 250/559.38

FOREIGN PATENT DOCUMENTS

| JP | 08-313631 A | 11/1996 |
|---|---|---|
| JP | 09-264949 A | 10/1997 |
| JP | 11-023713 A | 1/1999 |
| JP | 2004-045304 A | 2/2004 |
| JP | 2008-102000 A | 5/2008 |
| JP | 2008-164496 A | 7/2008 |

OTHER PUBLICATIONS

Office Action dated Sep. 13, 2012, issued for the counterpart Korean Patent Application.
European Search Report issued Jul. 3, 2012 for corresponding EP Application No. 10746333.3.

* cited by examiner

DISTANCE MEASURING DEVICE

TECHNICAL FIELD

The present invention is directed to distance measuring devices, and particularly to an active type distance measuring device based on the ToF (time of flight) measurement.

BACKGROUND ART

Document 1 (JP 2004-45304) discloses a distance measuring device based on the time of flight measurement. The distance measuring device disclosed in Document 1 is configured to emit intensity-modulated light having an intensity oscillating at a constant period such as a sine wave. The distance measuring device is configured to measure a phase difference between a waveform of the intensity-modulated light at emitted time and a waveform of the intensity-modulated light at received time, and calculate a distance to a target on the basis of the measured phase difference.

In the distance measuring device disclosed in Document 1, the phase difference between the waveforms at the emitted time and the received time is corresponding to a time period (time difference between the emitted time and the received time) starting at the time of emitting the intensity-modulated light and ending at the time of receiving the intensity modulated light reflected by the target. The time difference $\tau$ is expressed by the equation: $\tau = T(\Psi/2\pi)$, wherein T [s] is the period of the intensity-modulated light and c [m/s] is the light speed and $\Psi$ [rad] is the phase difference between the waveforms. The distance L to the target is expressed by the equation: $L = (1/2)c\, T(\Psi/2\pi)$.

The time measuring device disclosed in Document 1 has the maximum measuring distance which is corresponding to a half period of the intensity-modulated light. Therefore, the maximum measuring distance can be extended with a decrease in the frequency of the intensity-modulated light. However, decreasing the frequency of the intensity-modulated light for extending the maximum measuring distance causes a decrease in distance resolution.

DISCLOSURE OF INVENTION

In view of the above insufficiency, the present invention has been aimed to propose the distance measuring device capable of extending the maximum measuring distance without causing a decrease in the distance resolution.

The distance measuring device in accordance with the present invention includes: a light source configured to emit light to a target space in which a target exists; a photoelectric converter configured to receive light from the target space within reception time period and produce an amount of electric charges corresponding to an intensity of the received light; a charge accumulator configured to accumulate the electric charges generated by the photoelectric converter over a predetermined accumulation time period longer than the reception time period; a timing controller; a delay controller; and a distance calculator. The timing controller is configured to output a modulation signal to the light source and is configured to output plural reference timing signals to the delay controller. The modulation signal is defined as a square wave signal with high and low level periods appearing alternately. Each of the high and low level periods has its length randomly selected from integral multiples of a predetermined unit time period. The plural reference timing signals include a non-inverted reference timing signal having the same waveform as that of the modulation signal, and an inverted reference timing signal which is an inverted one of the non-inverted reference timing signal. The light source is configured to vary an intensity of the light in concordance with the modulation signal received from the timing controller. The delay controller is configured to delay the plural reference timing signals received from the timing controller by a predetermined delay period to create plural timing signals respectively, and output the plural timing signals to the photoelectric converter. The photoelectric converter is configured to select, as the reception time period, one of high and low level periods with regard to the plural timing signals received from the delay controller. The charge accumulator is configured to accumulate the electric charges generated by the photoelectric converter in association with the corresponding timing signal with regard to each of the plural timing signals. The distance calculator is configured to calculate a time difference with reference to amounts of the electric charges respectively associated with the plural timing signals, and calculate a distance to the target on the basis of the calculated time difference and the delay period.

In a preferred aspect, the plural reference timing signals include a first reference timing signal identical to the modulation signal, a second reference timing signal defined as a signal obtained by inversion of the first reference timing signal, a third reference timing signal having the same waveform as that of the modulation signal and delayed from the modulation signal by the unit time period, and a fourth reference timing signal defined as a signal obtained by inversion of the third reference timing signal. The distance calculator is configured to calculate the time difference with reference to amounts of the electric charges respectively associated with the first, second, third, and fourth reference timing signals.

In a preferred aspect, the distance calculator is configured to calculate the distance to the target in a manner to add a distance determined by the delay period to a distance determined by the time difference.

In a preferred aspect, the distance measuring device further comprises a distance range setting unit. The distance range setting unit is configured to select the delay period from different time periods in accordance with a received input signal and send the selected delay period to the delay controller. The delay controller is configured to delay the reference timing signal by the delay period received from the distance range setting unit to create the timing signal.

In a preferred aspect, the distance measuring device includes a plurality of the photoelectric converters. The photoelectric converters are arranged in a common plane to form an imaging area. The distance calculator is configured to create a distance image defined by a plurality of pixels respectively associated with the plurality of the photoelectric converters. Each of the pixels has its pixel value. The distance calculator is configured to determine whether or not the distance to the target is identical to a predetermined distance with regard to each of the pixels, and differentiate the pixel value of the pixel corresponding to the distance to the target identical to the predetermined distance and the pixel value of the pixel corresponding to the distance to the target not identical to the predetermined distance. The predetermined distance is defined as a distance determined by a difference between time at which the light source emits the light, and time at which the amount of the electric charges associated with the non-inverted reference timing signal first becomes equivalent to the amount of the electric charges associated with the inverted reference timing signal after a lapse of the delay period starting from the time at which the light source emits the light.

In a preferred aspect, the distance measuring device further includes a distance range setting unit. The distance range setting unit is configured to select the delay period from different time periods and send the selected delay period to the delay controller. The delay controller is configured to delay the reference timing signal by the delay period received from the distance range setting unit to create the timing signal.

In a preferred aspect, the distance measuring device further includes: an event detector configured to determine whether or not a predetermined event occurs in the target space; and a plurality of the photoelectric converters. The photoelectric converters are arranged in a common plane to form an imaging area. The distance range setting unit is configured to, upon acknowledging that the event detector determines that the event occurs, select the delay period in concordance with a distance to a location in the target space at which the event occurs. The distance calculator is configured to create a distance image defined by a plurality of pixels respectively associated with the plurality of the photoelectric converters, and each of the pixels having its pixel value corresponding to a distance to the target.

In a preferred aspect, the distance measuring device includes a plurality of the photoelectric converters. The photoelectric converters are arranged in a common plane to form an imaging area. The distance range setting unit is configured to select the plural delay periods defining different measuring ranges. The distance calculator is configured to create plural distance images respectively corresponding to the plural delay periods. Each of the plural distance images is defined by a plurality of pixels respectively associated with the plurality of the photoelectric converters. Each of the pixels has its pixel value. The distance calculator is configured to select a valid pixel value as the pixel value of the pixel corresponding to the distance to the target which is within the measuring range. The valid pixel value is configured to denote the distance to the target. The distance calculator is configured to select an invalid pixel value as the pixel value of the pixel corresponding to the distance to the target which is out of the measuring range. The invalid pixel value is configured to denote that the distance to the target is out of the measuring range. The distance calculator is configured to synthesize the plural distance images into a synthetic distance image in a manner to reduce the number of the pixels having the invalid pixel value.

In a preferred aspect, the plural delay periods are selected in such a manner as to make the respective measuring ranges consecutive.

In a preferred aspect, the distance calculator is configured to select the valid pixel value as the pixel value of the pixel corresponding to the distance to the target which is identical to a predetermined distance, and to select the invalid pixel value as the pixel value of the pixel corresponding to the distance to the target which is not identical to the predetermined distance. The predetermined distance is defined as a distance determined by a difference between time at which the light source emits the light, and time at which the amount of the electric charges associated with the non-inverted reference timing signal first becomes equivalent to the amount of the electric charges associated with the inverted reference timing signal after a lapse of the delay period starting from the time at which the light source emits the light.

In a preferred aspect, the distance measuring device further includes a validation checking unit. The validation checking unit is configured to refer to whether or not a relation among the amounts of the electric charges respectively associated with the plural timing signals satisfies a predetermined judgment condition, and make determination of whether or not the distance to the target is within the measuring range. The distance calculator is configured to create the distance image with reference to a result of the determination made by the validation checking unit.

In a preferred aspect, the plural reference timing signals include a delayed non-inverted reference timing signal which has the same waveform as that of the modulation signal and is delayed from the modulation signal by the unit time period, and a delayed inverted reference timing signal defined as a signal obtained by inversion of the delayed non-inverted reference timing signal. The distance calculator is configured to calculate the time difference on the basis of the amounts of the electric charges respectively corresponding to the delayed non-inverted reference timing signal and the delayed inverted reference timing signal.

BEST MODE FOR CARRYING OUT THE INVENTION

Figure 1:
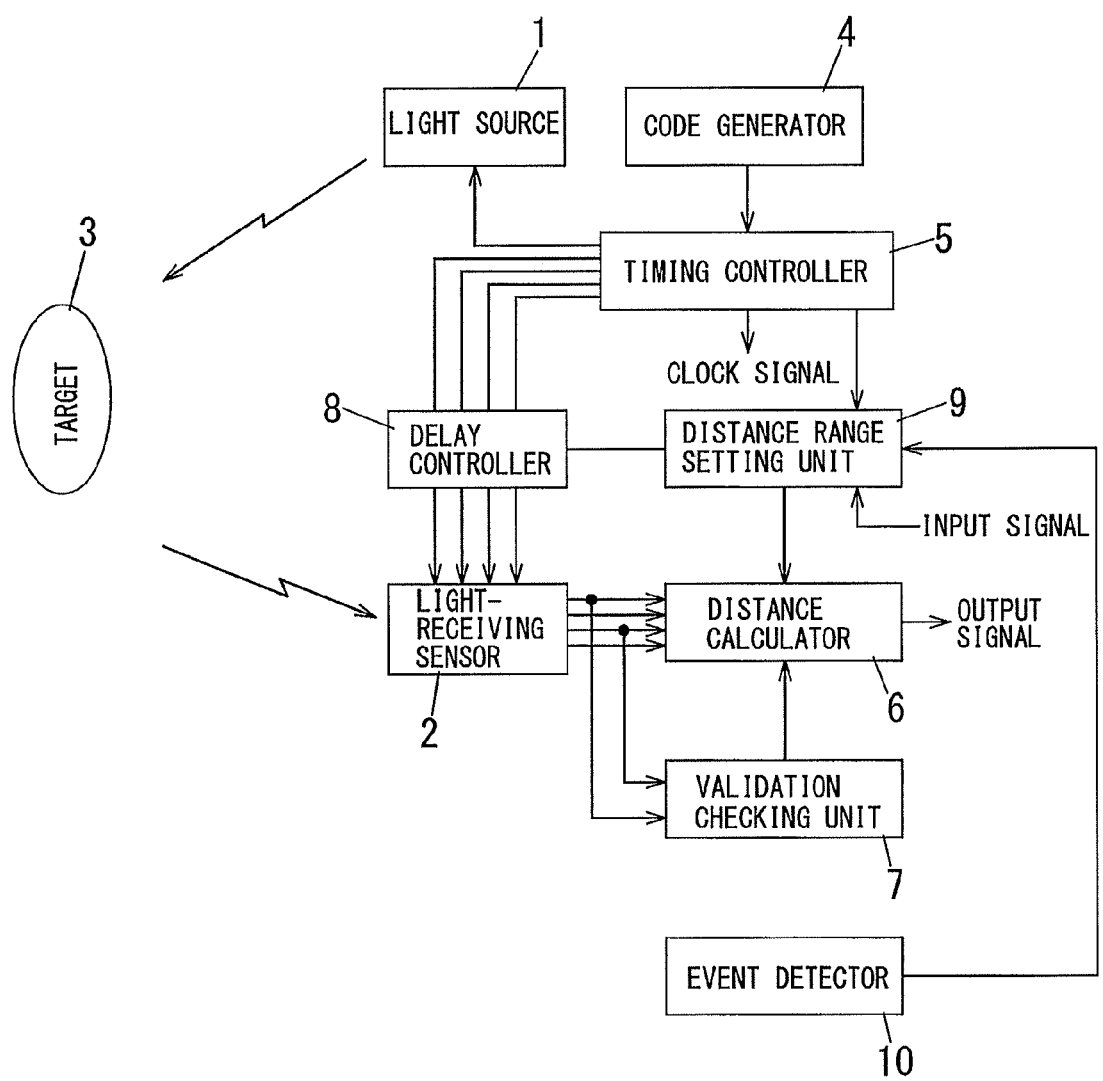
FIG. 1 is a block diagram illustrating a distance measuring device of one embodiment in accordance with the present invention.

As shown in FIG. 1, the distance measuring device of the present embodiment is an active type distance measuring device. The distance measuring device of the present embodiment includes a light source 1, a light-receiving sensor 2, a code generator 4, a timing controller 5, a distance calculator 6, a validation checking unit 7, a delay controller 8, and a distance range setting unit 9. The light source 1 is configured to emit light into a space (target space) in which a target 3 as a candidate of distance measurement exists. The light-receiving sensor 2 is configured to receive light from the target space. The distance measuring device of the present embodiment measures a distance to the target 3 on the basis of a physical amount corresponding to a time period (flight time) Tf (see (b) of FIG. 3) starting from time when the light source 1 emits light to the target 3 and ending on time when the light-receiving sensor 2 receives the light reflected by the target 3. In other words, the distance measuring device of the present embodiment measures the distance to the target 3 by means of the time of flight measurement.

The light source 1 is a light emitting element (e.g., a light emitting diode and a laser diode) which enables modulation of a light output (an intensity of light) at a high frequency (e.g., 10 MHz).

The light-receiving sensor 2 is a light-receiving element configured to sense an intensity variation of the received light observed within a short time period substantially same as a time period within which a variation of the light output of the light emitted from the light source 1 is observed.

The light-receiving sensor 2 is a light-receiving element (image pickup element) having multiple light-receiving regions (regions corresponding to pixels) such as a CCD area image sensor and a CMOS area image sensor. In this instance, it is possible to measure at one time a distance to the target 3 existing in a spatial region determined by the field of view of the light-receiving element. In brief, a distance image defined by plural pixels each of which has its pixel value indicative of a distance value (value in concordance with the distance to the target 3) can be created without scanning the spatial region by use of the light emitted from the light source 1 and/or the field of view of the light-receiving element.

The following explanation is made to the four light-receiving regions adjacent to each other. The four light-receiving regions constitute a single pixel (cell) corresponding to a single pixel of the distance image. In the present embodiment, information regarding the single pixel of the distance image can be obtained from the light-receiving amount of the single cell. Operation regarding the single pixel of the distance image can be explained by operation regarding the four light-receiving regions. Each of the light-receiving regions of the light-receiving sensor 2 is equivalent to the light-receiving element (e.g., a photodiode and a phototransistor) having a single light-receiving region. In brief, the light-receiving sensor 2 generates an amount of electric charges corresponding to an intensity of received light (actually, a light-receiving amount within a predetermine time period), and collects the same. The four light-receiving regions are arranged in line or in two-by-two array, for example. Besides, a single light-receiving region can be used as a pixel corresponding to a single pixel of the distance image.

When the light-receiving sensor 2 is a photodiode or a phototransistor, a gate circuit such as an analog switch is provided for taking out the electric charges generated by the light-receiving sensor 2 within a reception time period. When the light-receiving sensor 2 is an imaging device, a length of the reception time period for collecting the electric charges is determined by use of an electric shutter for the imaging device, for example. Accumulation of the electric charges for each light-receiving region of the light-receiving sensor 2 are repeated multiple times (e.g., 10000 times), and the accumulated electric charges are ejected (hereinafter, a time period for accumulating electric charges is referred to as "accumulation time period"). The reception time period is defined as a short time period in which the intensity of the received light is considered to be constant. Therefore, in the reception time period, the light-receiving amount is equivalent to the intensity of the received light.

In other words, the light-receiving sensor 2 includes the plural photoelectric converters, the charge accumulator, and the charge ejector. Each of the photoelectric converters generates an amount of electric charges corresponding to the intensity of the light received from the target space within the reception time period. In other words, the photoelectric converter generates the amount of the electric charges corresponding to the light-receiving amount within the reception time period and collects the same. In the present embodiment, the plural photoelectric converters are arranged in a common plane to form an imaging area. The charge accumulator accumulates the electric charges collected by the photoelectric converter (electric charges generated by the photoelectric converter) over the predetermined accumulation time period enough longer than the reception time period. The charge ejector ejects the electric charges accumulated by the charge accumulator. With respect to a CCD image sensor of a FT type, the photoelectric converter is corresponding to a pixel of an imaging region, and the charge accumulator is corresponding to an accumulation region, and the charge ejector is corresponding to a horizontal transfer unit. Further, with respect to a CCD image sensor of an IT type, the photoelectric converter is corresponding to a pixel of an imaging region, and the charge accumulator is corresponding to a vertical transfer unit, and the charge ejector is corresponding to a horizontal transfer unit.

With accumulating the electric charges collected by the photoelectric converter, it is possible to increase the amount of the electric charges associated with the light-receiving region and ejected. Therefore, a signal level can be enhanced and an effect caused by a shot noise can be reduced. In a situation where the light output of the light source 1 is modulated by a frequency of 10 MHz, the number of times for ejecting the electric charges from the light-receiving sensor 2 can be 30 times per second or more, even if the number of the accumulation is about 10000. In other words, a smooth dynamic image can be created by use of the distance images.

Figure 2:
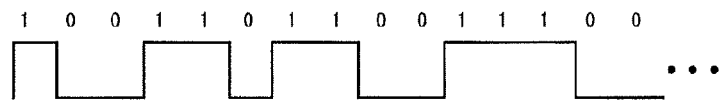
FIG. 2 is a schematic diagram illustrating a modulation signal used in the above distance measuring device.

As shown in FIG. 2, a modulation signal is a square wave signal. In FIG. 2, the signal value of "1" indicates that the modulation signal is a high level, and the signal value of "0" indicates that the modulation signal is a low level. The modulation signal becomes the high level or low level irregularly. The probability that the modulation signal is the high level is equivalent to the probability that the modulation signal is the low level. The modulation signal is created by using a technique (e.g., a gold code generator) for creating a PN (Pseudorandom Noise) code used in spread spectrum techniques. The modulation signal is created in a similar manner as the PN code such that each of high and low level periods has its length selected from integral multiples of a predetermined unit time period. In the following, in conformity with the PN code, the unit time period is referred to as "chip duration". For example, the chip duration is 100 [ns], but is not limited thereto.

In brief, the modulation signal is a square wave signal having the signal value (first signal value) which varies between a first value (e.g., a value corresponding to the high level) and a second value (e.g., a value corresponding to the low level) alternately. Each of a first period within which the first signal is the first value and a second period within which the first signal value is the second value has its length selected from integral multiples of the predetermined unit time. The length of each of the first period and the second period is randomly determined. Besides, the first value may be a value corresponding to the low level and the second value may be a value corresponding to the high level.

The code generator 4 is configured to generate the modulation signal and outputs the same. The modulation signal output from the code generator 4 is provided to the light source 1 via the timing controller 5.

The light source 1 is kept turned on while the modulation signal is the high level, and is kept turned off while the modulation signal is the low level. In brief, the light source 1 is turned on and off (varies an intensity of light) in accordance with the signal value (first signal value)

The timing controller 5 is configured to receive the modulation signal from the code generator 4 and output the received modulation signal to the light source 1. Further, the timing controller 5 is configured to output plural reference timing signals to the delay controller 8.

The timing controller 5 is configured to generate the reference timing signal with reference to the modulation signal received from the code generator 4. The reference timing signal is used for determining the reception time period within which the light-receiving sensor 2 collects the generated electric charges. In the present embodiment, the four different reference timing signals are generated for creating a single distance image. The four different reference timing signals are respectively corresponding to the four light-receiving regions of the light-receiving sensor 2, and respectively determine the reception time periods of the four light-receiving regions. Further, the timing controller 5 is configured to output a clock signal. The clock signal is used for determining timing at which the electric charges accumulated by the light-receiving sensor 2 are ejected, and operation timings of the distance calculator 6 and the validation checking unit 7, for example.

Figure 3:
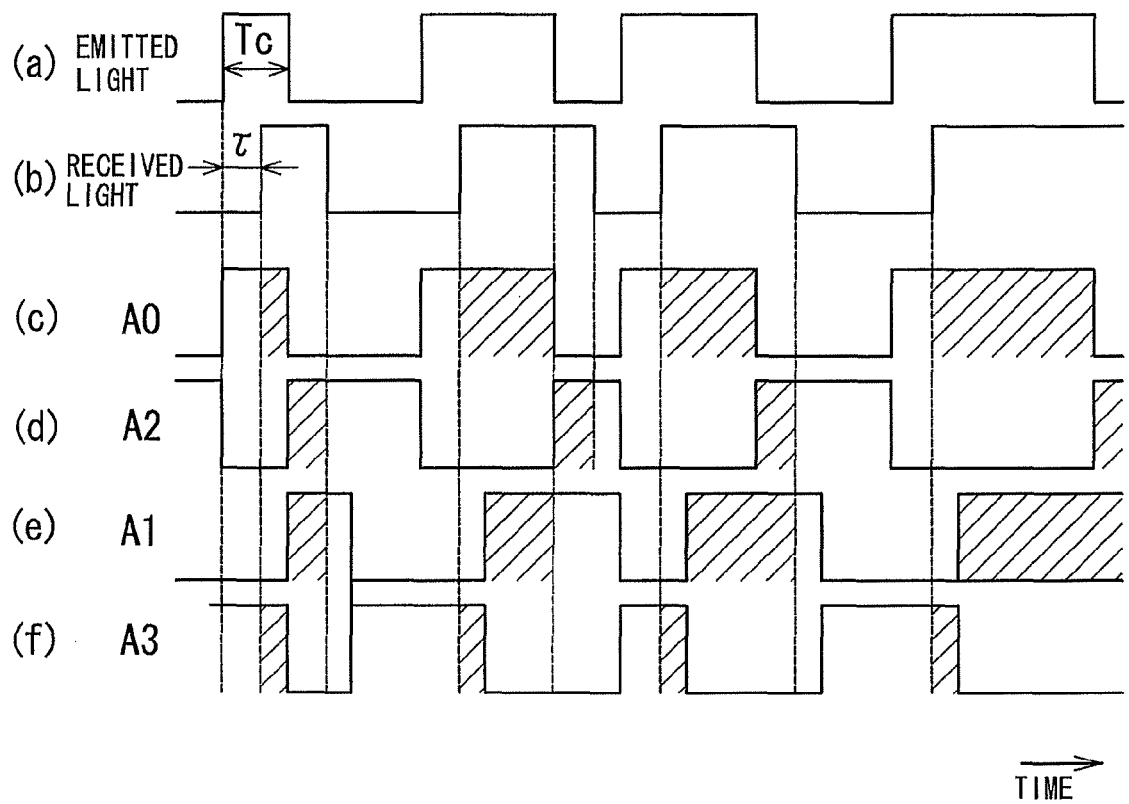
FIG. 3 is an explanatory diagram illustrating operation of the above distance measuring device.

FIG. 3 illustrates a relation between the modulation signal and the reference timing signals. With regard to FIG. 3, (a) illustrates the modulation signal (an intensity of the light emitted from the light source 1), and (b) illustrates an intensity of the light received by the light-receiving sensor 2. The timing controller 5 creates the first reference timing signal (see (c) of FIG. 3), the second reference timing signal (see (d) of FIG. 3), the third reference timing signal (see (e) of FIG. 3), and the fourth reference timing signal (see (f) of FIG. 3) with reference to the modulation signal.

As shown in (c) of FIG. 3, the first reference timing signal is identical to the modulation signal. In brief, the first reference timing signal has the same waveform as that of the modulation signal and is not delayed from the modulation signal. As shown in (d) of FIG. 3, the second reference timing signal is a signal (inverted modulation signal) obtained by inversion of the modulation signal with respect to the high and low levels. In brief, the second reference timing signal has the same waveform as that of the inverted modulation signal and is not delayed from the inverted modulation signal. In other words, the second reference timing signal is defined as a signal obtained by inversion of the first reference timing signal. As shown in (e) of FIG. 3, the third reference timing signal is a signal delayed from the modulation signal by single chip duration (unit time period) Tc. In brief, the third reference timing signal has the same waveform as that of the modulation signal and is delayed from the modulation signal. As shown in (f) of FIG. 3, the fourth reference timing signal is a signal obtained by the steps of delaying the modulation signal by the single chip duration Tc and inverting the delayed modulation signal with respect to the high and low levels. In brief, the fourth reference timing signal has the same waveform as that of the inverted modulation signal and is delayed from the inverted modulation signal. In other words, the fourth reference timing signal is defined as a signal obtained by inversion of the third reference timing signal.

As described in the above, the timing controller 5 is configured to create the plural reference timing signals. The plural reference timing signals includes a non-inverted reference timing signal (e.g., the first reference timing signal and the third reference timing signal) having the same waveform as that of the modulation signal, and an inverted reference timing signal (e.g., the second reference timing signal and the fourth reference timing signal) defined as a signal obtained by inversion of the non-inverted reference timing signal. The third reference timing signal is defined as a delayed non-inverted reference timing signal having the same waveform as that of the modulation signal and delayed from the modulation signal by the unit time period. The fourth reference timing signal is defined as a delayed inverted reference timing signal obtained by inversion of the delayed non-inverted reference timing signal (the third reference timing signal).

The delay controller 8 is interposed between the timing controller 5 and the light-receiving sensor 2. The delay controller 8 is configured to delay each of the reference timing signals received from the timing controller 5 by a delay period Td to create plural timing signals and output the same to the light-receiving sensor 2. In the present embodiment, the delay controller 8 shifts the reference timing signals respectively illustrated in (c) to (f) of FIG. 3 backward along a time axis (i.e., delay the signals) while maintaining a relative time relation among the reference timing signals. Consequently, the delay controller 8 creates a first timing signal (see (c) of FIG. 6) obtained by means of delaying the first reference timing signal by the delay period, a second timing signal (see (d) of FIG. 6) obtained by means of delaying the second reference timing signal by the delay period, a third timing signal (see (e) of FIG. 6) obtained by means of delaying the third reference timing signal by the delay period, and a fourth timing signal (see (f) of FIG. 6) obtained by means of delaying the fourth reference timing signal by the delay period. In the instances shown in (c) to (f) of FIG. 6, the delay period is (2/3)Tc. Besides, when the delay period is "0", the timing signal is identical to the corresponding reference timing signal.

The distance range setting unit 9 is used for determining the delay period of the delay controller 8. The distance range setting unit 9 is configured to select the delay period from different time periods. The distance range setting unit 9 indicates, to the delay controller 8, which time period the delay controller 8 should select. The distance range setting unit 9 determines the delay period in concordance with input (user's input) from a controller (e.g., a switch) or input of a signal designating the delay period. In brief, the distance range setting unit 9 is configured to select the delay period from the different time periods and send the selected delay period to the delay controller 8. The delay controller 8 is configured to delay the reference timing signal by the delay period received from the distance range setting unit 9 to create the timing signal.

The light-receiving sensor 2 receives the light emitted from the light source 1 and reflected from the target 3 after an elapse of time corresponding to the distance to the target 3 (from the time when the light is emitted). Each light-receiving region of the light-receiving sensor 2 generates the electric charges within a time period when the corresponding reference timing signal is the high level. An amount A0 of the electric charges generated by the light-receiving region (first light-receiving region) associated with the first reference timing signal is corresponding to an area designated by a hatching in (c) of FIG. 3. An amount A2 of the electric charges generated by the light-receiving region (second light-receiving region) associated with the second reference timing signal is corresponding to an area designated by a hatching in (d) of FIG. 3. An amount A1 of the electric charges generated by the light-receiving region (third light-receiving region) associated with the third reference timing signal is corresponding to an area designated by a hatching in (e) of FIG. 3. An amount A3 of the electric charges generated by the light-receiving region (fourth light-receiving region) associated with the fourth reference timing signal is corresponding to an area designated by a hatching in (f) of FIG. 3.

The electric charges are ejected from the light-receiving sensor 2 after accumulation of the electric charges is repeated multiple times for each light-receiving region (after the electric charges are accumulated over a multiple of the chip duration Tc). Therefore, the amounts of the electric charges respectively ejected from the light-receiving regions converge on a value expressed by a linear function of the flight time Tf due to randomness of the modulation signal (i.e., the lengths of the first and second periods are randomly determined). The flight time Tf is identical to a value (Tf=Td+τ) obtained by means of adding a time difference τ to the delay period Td. The time difference τ is calculated by use of the amounts A0 to A3 of the electric charges ejected from the light-receiving sensor 2. In the instance shown in FIG. 3, since the delay period Td is "0", the time difference τ is identical to the flight time Tf.

Figure 4:
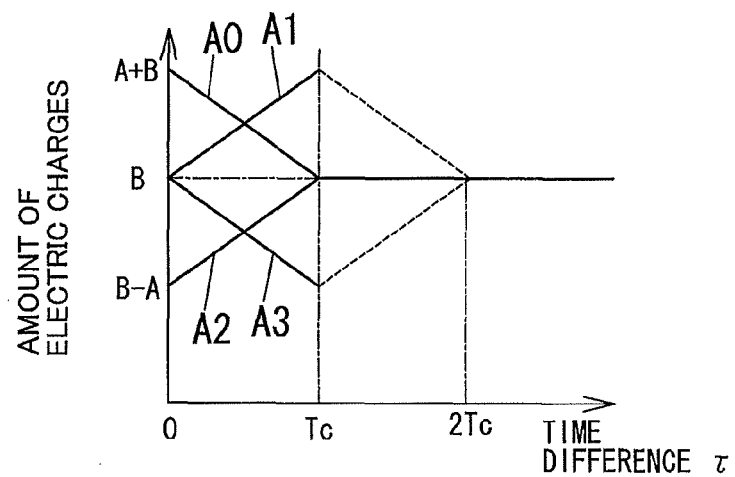
FIG. 4 is an explanatory diagram illustrating the operation of the above distance measuring device.

As shown in FIG. 4, when the time difference τ is in the range of "0" to Tc, the amounts A0 and A3 of the electric charges decrease with an increase of the time difference τ, and the amounts A1 and A2 of the electric charges increase with an increase of the time difference τ.

In theory, the amounts A0 to A3 of the electric charges satisfy a relation: A0+A1+A2+A3=constant. Further, when the time different τ is "0", the amount A0 of the electric charges is identical to a half of the amount of the electric charge generated by the light-receiving sensor 2 receiving the light over the entire accumulation time period (i.e., the reception time period is identical to the accumulation time period). When the time different τ is identical to the single chip duration Tc, the amount A1 of the electric charges is identical to a half of the amount of the electric charge generated by the light-receiving sensor 2 receiving the light over the entire accumulation time period (i.e., the reception time period is identical to the accumulation time period).

Each of the amounts A0 to A3 of the electric charges is expressed as follows when τ is in the range of "0" to Tc. In the following, a relation of (A0+A2)/2=(A1+A3)/2=B is fulfilled, and the amount A0 of the electric charges is "A+B" when the time difference τ [s] is "0".

$$A0 = -\alpha \cdot \tau + A + B$$
$$A1 = \alpha \cdot \tau + B$$
$$A2 = \alpha \cdot \tau + B - A$$
$$A3 = -\alpha \cdot \tau + B \quad \text{[FORMULA 1]}$$

In the above, "α" denotes a constant which indicates a rate of the amount of the electric charges to the time difference τ, and a relation of α=A/Tc is fulfilled.

In view of the above, the time difference τ [s] is determined by the following formula.

$$\tau = \frac{(A1 - A3) \cdot Tc}{\{(A0 - A2) + (A1 - A3)\}} \quad \text{[FORMULA 2]}$$

When the distance to the target 3 is expressed as L [m], and the speed of light is expressed as "c" [m/s], the distance L is determined by a relation: L=c*τ/2.

When the single chip duration Tc is 100 [ns], τ is in the range of 0 to 100 [ns]. Therefore, L is in the range of 0 to 15 [m]. When the delay period Td is 0 [s] and the single chip duration Tc is 100 [ns], a measurable maximum distance (hereinafter referred to as "maximum measuring distance") is 15 [m].

The distance calculator 6 performs the aforementioned calculation with reference to the electric charges generated by the light-receiving sensor 2 within a period defined by the reference timing signal generated by the timing controller 5, thereby determining the distance L to the target 3.

Besides, as apparent from the aforementioned formulae, the time difference τ [s] can be determined by use of three of the four amounts A0 to A4 of the electric charges. When the three amounts A1, A2, and A3 of the electric charges are used, A1−A2=A, and A1−A3=2ατ. Therefore, τ is expressed as a relation: τ=(Tc/2)(A1−A3)/(A1−A2). When the three amounts A0, A1, and A2 of the electric charges are used, A0=−(A/Tc)τ+A+B, and A1=(A/Tc)τ+B, and A2=(A/Tc)τ−A+B. Therefore, the time difference τ is expressed as the following formula.

$$\tau = \frac{2A1 - (A0 + A2)}{2(A1 - A2)} Tc \quad \text{[FORMULA 3]}$$

When disturbance light (disturbance component) is considered to be ignored (i.e., B=A), there are two unknowns, that is, the time difference τ [s] and A. Thus, the time difference τ [s] can be determined by use of only two of the four amounts A0 to A4 of the electric charges. When the two amounts A0 and A2 of the electric charges are used, A0=−(A/Tc)τ+2A, and A2=(A/Tc)τ. Therefore, the time difference τ is expressed as the following formula.

$$\tau = \frac{2A2}{A0 + A2} Tc \quad \text{[FORMULA 4]}$$

Moreover, when the constant α is preliminarily calculated from the known distance (or when the target 3 has a constant reflectance), "A" is known. In this situation, there are two unknowns, that is, the time difference τ [s] and "B". Thus, the time difference τ [s] can be determined by use of only two of the four amounts A0 to A4 of the electric charges. When the two amounts A0 and A2 of the electric charges are used, A0=−(A/Tc)τ+A+B, and A2=(A/Tc)τ−A+B. Therefore, the time difference τ is expressed as a relation: τ={(2A−A0+A2)/2A}Tc.

When the light source 1 is kept turned off within the accumulation time period, the amount A2 of the electric charges is identical to the amount (=B−A) of the electric charges obtained when the time difference τ is "0". Thus, "B−A" can be determined based on the amount of the electric charges generated by the light-receiving sensor 2 while the light source 1 is turned off. Therefore, when "B−A" is preliminarily determined, the time difference τ [s] can be determined by use of only two of the four amounts A0 to A4 of the electric charges. When the two amounts A0 and A2 of the electric charges are used, the time difference τ is expressed as the following formula, wherein AL=B−A.

$$\tau = \frac{2(A2 - AL)}{A0 + A2 - 2AL} Tc \quad \text{[FORMULA 5]}$$

When the light source 1 is kept turned on at a predetermined intensity within the accumulation time period, the amount A1 of the electric charges is identical to the amount (="A+B") of the electric charges obtained when the time difference τ is 0. Thus, "A+B" can be determined based on the amount of the electric charges generated by the light-receiving sensor 2 while the light source 1 is turned on. Therefore, when "A+B" is preliminarily determined, the time difference τ [s] can be determined by use of only two of the four amounts A0 to A4 of the electric charges. When the two amounts A0 and A2 of the electric charges are used, the time difference τ is expressed as the following formula, wherein AH=A+B.

$$\tau = \frac{2(AH - A0)}{2AH - (A0 + A2)} Tc \qquad \text{[FORMULA 6]}$$

When the target 3 has a constant reflectance and the disturbance component is considered to be ignored, "A" is known and "B" is 0. In this condition, only the time distance $\tau$ [s] is an unknown. Therefore, the time difference $\tau$ [s] can be determined by use of one of the four amounts A0 to A4 of the electric charges.

As described in the above, when the imaging device obtains the amounts A0 to A3 of the electric charges respectively corresponding to the four different reference timing signals, a single distance value may be obtained by use of a single accumulation time period. In this situation, the four (e.g., one by four or two by two array) adjacent light-receiving regions (the first light-receiving region, the second light-receiving region, the third light-receiving region, and the fourth light-receiving region) of the imaging device are collectively referred to as constituting a single group. The first light-receiving region collects the electric charges in concordance with the first reference timing signal (first timing signal). The second light-receiving region collects the electric charges in concordance with the second reference timing signal (second timing signal). The third light-receiving region collects the electric charges in concordance with the third reference timing signal (third timing signal). The fourth light-receiving region collects the electric charges in concordance with the fourth reference timing signal (fourth timing signal). The electric charges collected by each light-receiving region are accumulated over the accumulation time period. When the imaging device accumulates the electric charges in the above manner, the four light-receiving regions are used in the single accumulation time period. Therefore, the single distance value can be obtained from the single accumulation time period. Although this instance causes a decrease in resolution in comparison with an example where each light-receiving region sequentially collects the electric charges in concordance with the plural reference timing signals, this instance can read out the four amounts A0 to A3 of the electric charges from the imaging device at one time. According to this instance, it is possible to decrease the number of times of reading out the electric charges necessary for creating the distance image corresponding to a screen size. Thus, it is possible to shorten the time necessary for creating the distance image corresponding to the screen size. Further, a smooth dynamic image can be created by use of the distance images.

Alternatively, the single distance value may be obtained from the four successive accumulation time periods. In this instance, the four different reference timing signals (timing signals) are provided to each light-receiving region of the imaging device in a predetermined order. In brief, the four successive accumulation time periods are treated as one cycle. For example, each light-receiving region collects the electric charges in concordance with the first reference timing signal (first timing signal) within the first accumulation time periods. Each light-receiving region collects the electric charges in concordance with the second reference timing signal (second timing signal) within the second accumulation time periods. Each light-receiving region collects the electric charges in concordance with the third reference timing signal (third timing signal) within the third accumulation time periods. Each light-receiving region collects the electric charges in concordance with the fourth reference timing signal (fourth timing signal) within the fourth accumulation time periods. In brief, each light-receiving region collects the electric charges for each accumulation time period in concordance with the reference timing signal (timing signal) corresponding to the accumulation time period. When the imaging device accumulates the electric charges in the aforementioned manner, the single distance value requires the four accumulation time periods. Although this instance prolongs the time necessary for creating the distance image corresponding to the screen size in comparison with an example where the plural light-receiving regions collect the electric charges in concordance with the plural different reference timing signals respectively, this instance can obtain the distance value for each light-receiving region. According to this instance, it is possible to create the distance image with high resolution.

The validation checking unit 7 is configured to refer to whether or not a relation among the amounts of the electric charges respectively corresponding to the plural timing signals satisfies a predetermined judgment condition, and make determination of whether or not the distance to the target 3 is within the measuring range The amounts A0 and A2 of the electric charges become constant value "B" when the time difference $\tau$ exceeds the single chip duration Tc. While the time difference $\tau$ is not less than 0 and is not greater than Tc, the amount A1 of the electric charges increases with an increase of the time difference $\tau$. While the time difference $\tau$ is greater than Tc and is not greater than 2Tc, the amount A1 of the electric charges decreases with an increase of the time difference $\tau$. While the time difference $\tau$ is not less than 0 and is not greater than Tc, the amount A3 of the electric charges decreases with an increase of the time difference $\tau$. While the time difference $\tau$ is greater than Tc and is not greater than 2Tc, the amount A3 of the electric charges increases with an increase of the time difference $\tau$. The amounts A1 and A3 of the electric charges become constant value "B" when the time difference $\tau$ exceeds the double of the chip duration Tc.

When Tc is less than $\tau$, a relation of A0−A2=0 is satisfied. Actually, however, the amounts A0 and A2 of the electric charges suffer from fluctuation under a condition where a shot noise occurs due to the disturbance light, for example. In brief, even if Tc is less than $\tau$, a relation of A0−A2=0 is not necessarily satisfied.

Upon acknowledging that a difference between the amounts A0 and A2 of the electric charges is not greater than a predetermined threshold β (first threshold), the validation checking unit 7 determines that the time difference $\tau$ exceeds the single chip duration Tc (i.e., the distance to the target exceeds the maximum of the measuring distance (maximum measuring distance)). In brief, the judgment condition of the validation checking unit 7 is expressed by a relation of A0−A2≤β(≈0).

Upon determining that the distance to the target exceeds the maximum measuring distance, the validation checking unit 7 provides, to the distance calculator 6, an instruction for not outputting the distance value corresponding to the pixel. Upon receiving the instruction for not outputting the distance value, the distance calculator 6 determines the distance to the target 3 is invalid. Consequently, the distance calculator 6 does not output the distance to the target 3 which exceeds the maximum measuring distance. Accordingly, it is possible to prevent erroneous measurement of the distance.

Since the light-receiving sensor 2 includes multiple pixels, it can make the distance measurement for region where the distance to the target 3 does not exceed the maximum measuring distance. Even if the distance exceeding the maximum distance is nullified, the light-receiving sensor 2 does not lower its sensitivity.

In a condition where the amount of the electric charges exhibits large fluctuation due to shot noises caused by intense disturbance light, the relation of A0−A2≤β may be not fulfilled (i.e., a relation of A0−A2>β may be fulfilled) even when the time difference τ exceeds the single chip duration Tc. In view of the above, the validation checking unit 7 utilizes a difference between the amounts A1 and A3 of the electric charges (received light) for determination of whether or not the distance to the target 3 exceeds the maximum measuring distance. When 2Tc<τ, the difference between the amounts A1 and A3 of the electric charges is 0. Upon acknowledging that the difference between the amounts A1 and A3 of the electric charges is not greater than a predetermined threshold γ (second threshold), the validation checking unit 7 determines that the time difference τ exceeds the double of the chip duration Tc. In brief, the validation checking unit 7 employs the additional judgment condition expressed by a formula of A1−A3≤γ(≈0). Upon acknowledging that the relation of A1−A3≤γ is fulfilled, the validation checking unit 7 determines that the time difference τ exceeds the double of the maximum measuring distance. Upon determining that the distance to the target exceeds the double of the maximum measuring distance, the validation checking unit 7 provides, to the distance calculator 6, the instruction for not outputting the distance value corresponding to the pixel.

The validation checking unit 7 may compare the threshold β with the difference between the amounts A0 and A2 of the electric charges and compare the threshold γ with the difference between the amounts A1 and A3 of the electric charges. In this instance, it is possible to reliably determine whether or not the distance obtained by use of the electric charges exceeds the double of the maximum measuring distance. The threshold β may be equal to or different from the threshold γ.

In the present embodiment, the maximum measuring distance is a distance corresponding to the single chip duration Tc (in the aforementioned instance, the single chip duration Tc is 100 [ns], and the maximum measuring distance is 15 [m]). The measuring range of the target 3 is from 0 to 15 [m].

As described in the above, the delay controller 8 shifts the reference timing signals (see (c) to (f) of FIG. 3) along the time axis, and provides the resultant reference timing signals to the light-receiving sensor 2. For example, the delay controller 8 delays the reference timing signals by the single chip duration Tc. In a situation where the waveform of the intensity of the received light shown in (b) of FIG. 3 is shifted to the right by the single chip duration Tc, the amounts of electric charges obtained from the light-receiving regions are corresponding to the areas designated by the hatching shown in (c) to (d) of FIG. 3, respectively.

In other words, when the reference timing signals are shifted to the right by the single chip duration Tc, it is enabled to measure the distance to the target 3 placed in a distance based on the intensity of the received light having the waveform thus shifted to the right.

The distance which causes the waveform of the intensity of the received light to shift to the right by the single chip duration Tc is 15 [m] in the aforementioned condition. The distance to the target 3 is calculated by adding 15 [m] to the distance calculated by use of the timing signals created by shifting the reference timing signals shown in (c) to (f) of FIG. 3 to the right by the single chip duration Tc. Besides, when the reference timing signals are sifted to the right by the single chip duration Tc, the measuring range of the distance is from 15 [m] to 30 [m]. In other words, when the delay period is identical to the single chip duration Tc, the measuring range is from 15 [m] to 30 [m].

With using the timing signals created by shifting the reference timing signals to the right by the double of the chip duration Tc (i.e., the delay period Td=2Tc), the measuring range of the distance becomes from 30 [m] to 45 [m]. Notably, the intensity of the received light which is reflected from the target 3 decreases with an increase of the distance to the target 3. The available range of the delay for the timing signal (the maximum of the delay period) is determined in accordance with the intensity of the received light. Further, in the distance measuring device, a difference between the upper limit and the lower limit of the measuring range is not changed even when the measuring range is changed by varying the delay period. Therefore, the resolution of the distance measurement is not changed even in response to variation of the measuring range.

As understood from the aforementioned explanation, the width of the measuring range is determined by the unit time period. Further, the resolution of the distance measurement is determined by the unit time period. However, the upper limit and the lower limit of the measuring range are determined by the delay period.

Figure 5:
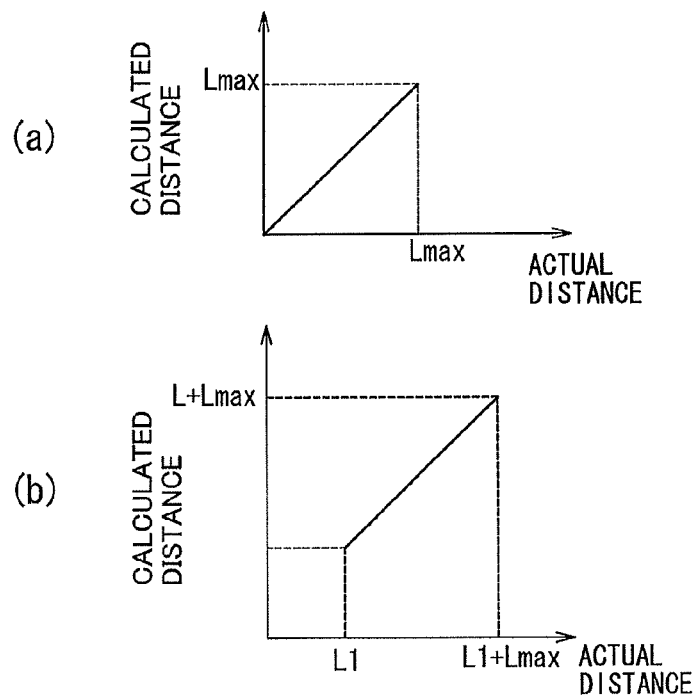
FIG. 5 is an explanatory diagram illustrating the operation of the above distance measuring device.

The distance measuring device of the present embodiment varies the measuring range by changing the delay period without changing the unit time period. Thereby, the distance measuring device varies the maximum measuring distance. Accordingly, the maximum measuring distance can be varied without causing bad effects on the resolution. The measuring range is determined by the unit time period and the delay period. Thus, as shown in (a) of FIG. 5, the measuring range has no periodicity, and the distance measurement is not performed in relation to the target 3 which is out of the measuring range. Accordingly, even when the maximum measuring distance is varied by means of adding an offset L1 corresponding to the delay period as shown in (b) of FIG. 5, there is no possibility that the distance measurement is accidentally performed for the target 3 which is out of the measuring range.

Like the above instance, when the timing signal is shifted by per unit of the chip duration Tc (provided that the delay period is any integral multiple of the chip duration Tc), there may arise a small difference between the amounts A0 and A2 of the electric charges relied upon for determination of the distance which lies around a boundary between measuring ranges (i.e., a boundary of 15 m between the measuring range of 0 m to 15 m and the measuring range of 15 m to 30 m), causing a possible measurement error. Accordingly, the delay period is preferably shorter than the chip duration Tc.

Figure 6:
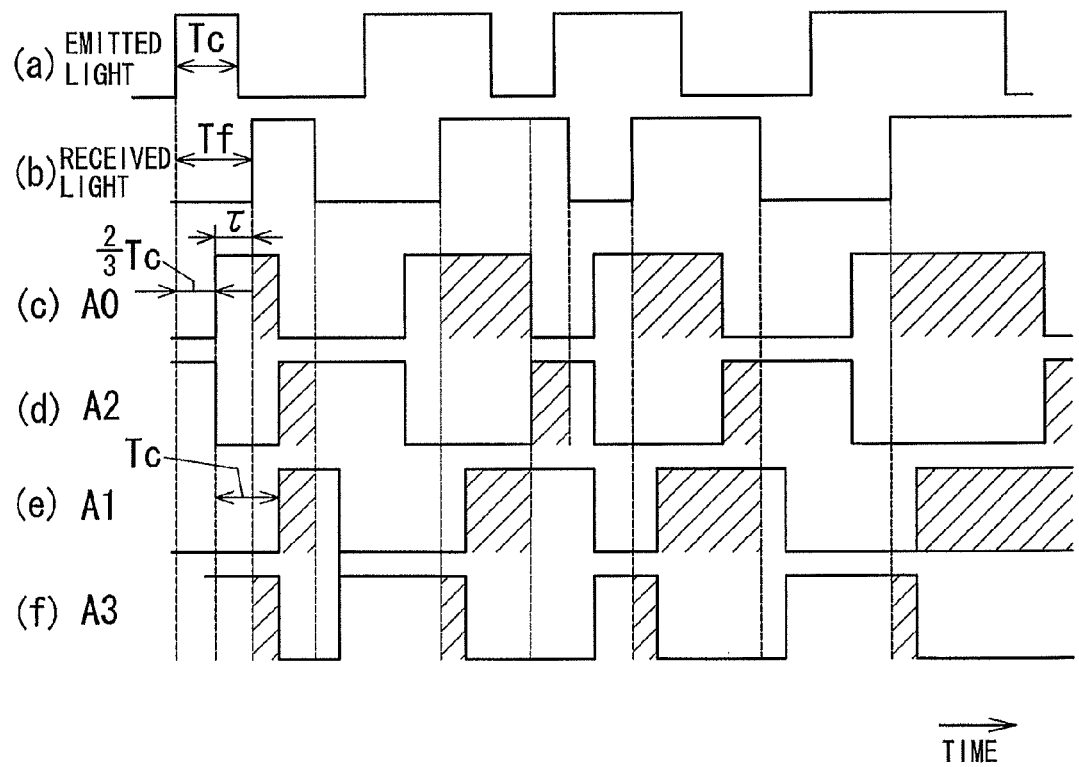
FIG. 6 is an explanatory diagram illustrating the operation of the above distance measuring device.

The following explanation with FIG. 6 is made to an instance where the delay period Td is two-thirds of the chip duration Tc. With respect to FIG. 6, (a) illustrates the modulation signal, and (b) illustrates the intensity of the light received by the light-receiving sensor 2, and (c) illustrates the first timing signal, and (d) illustrates the second timing signal, and (e) illustrates the third timing signal, and (f) illustrates the fourth timing signal.

The time difference τ, which is calculated with reference to the amounts A0 to A3 of the electric charges obtained from the light-receiving sensor 2, is not the flight time Tf starting from time at which the light source 1 emits the light and ending on time at which the light-receiving sensor 2 receives the light, but the time period starting from time at which the delay period Td=(2/3)Tc elapses after the light source 1 emits the light, and ending on time at which the light-receiving sensor 2 receives the light. Therefore, the time difference τ is determined by a relation: τ=Tf−Td.

When the chip duration Tc is 100 [ns], the distance determined by the delay period Td=(2/3)Tc is 10 m. With using the timing signals shown in FIG. 6, the measuring range is from 10 [m] to 25 [m] designated by R11 in (a) of FIG. 7. R10 designates the measuring range obtained when the delay period Td is 0. When the delay period Td is four-thirds of the chip duration Tc, the distance determined by the delay period Td=(4/3)Tc is 20 m. In this instance, as designated by R12 in (a) of FIG. 7, the measuring range is from 20 [m] to 35 [m]. The measuring range (near side measuring range) in accordance with the delay period Td=(2/3)Tc and the measuring range (far side measuring range) in accordance with the delay period Td=(4/3)Tc overlap by 5 meters. With avoiding using the amounts of the electric charges in relation to the distance near the upper limit (25 [m]) of the near side measuring range and the amounts of the electric charges in relation to the distance near the lower limit (20 [m]) of the far side measuring range, the measurement error can be suppressed.

Figure 7:
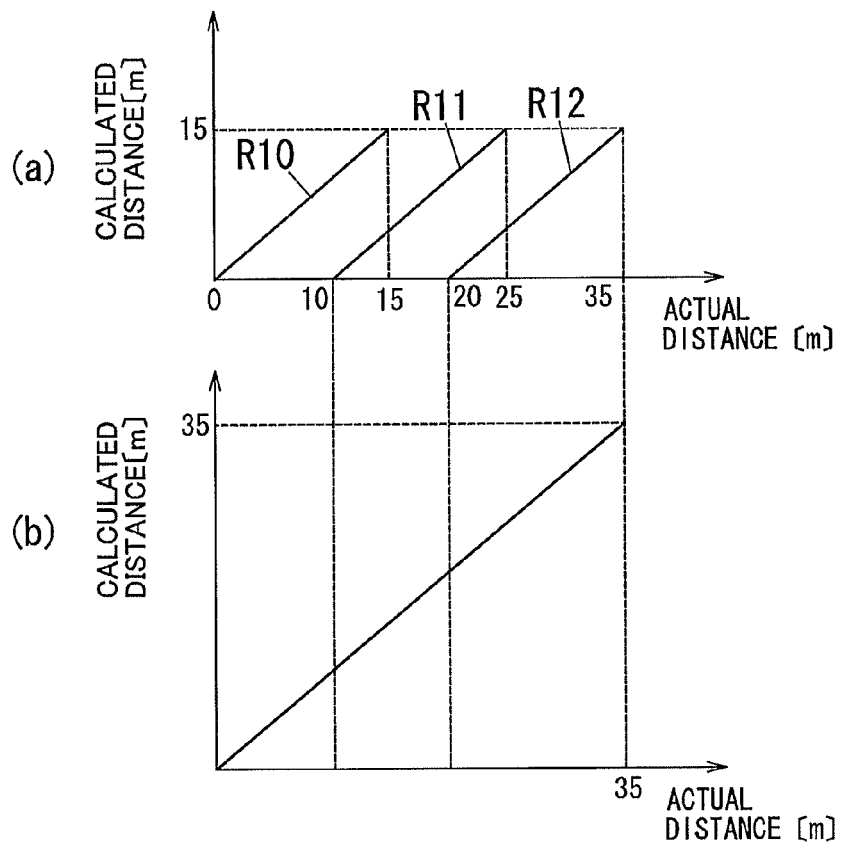
FIG. 7 is an explanatory diagram illustrating the principle of distance measurement of the above distance measuring device.

The distance calculator 6 performs distance correction (see (b) of FIG. 7) in response to a variation of the measuring range performed by means of shifting the reference timing signal along the time axis. The distance range setting unit 9 provides the delay period Td to the delay controller 8 and the distance calculator 6. In the distance correction, the distance calculator 6 adds the distance determined by the delay period Td provided from the distance range setting unit 9 to the distance calculated from the time difference τ. The distance calculator 6 performs the distance correction, thereby calculating the distance to the target 3.

The distance calculator 6 is configured to create the distance image defined by the plurality of the pixels respectively associated with the plurality of the photoelectric converters. Each pixel of the distance image is configured to have its pixel value indicating the distance to the target 3. The distance calculator 6 is configured to select a valid pixel value as the pixel value of the pixel corresponding to the distance to the target 3 which is within the measuring range. The valid pixel value denotes the distance to the target 3. The distance calculator 6 is configured to select an invalid pixel value as the pixel value of the pixel corresponding to the distance to the target 3 which is out of the measuring range. The invalid pixel value denotes that the distance to the target 3 is out of the measuring range.

Also when the distance to the target 3 is less than the lower limit (hereinafter referred to as "minimum measuring distance") of the measuring range, the difference between the amounts A1 and A3 of the electric charges is not greater than the threshold γ (see FIG. 4). Therefore, when the difference between the amounts A1 and A3 of the electric charges is not greater than the threshold γ, the validation checking unit 7 determines that the distance to the target 3 is not greater than the minimum measuring distance or is not less than the double of the maximum measuring distance. With respect to each group defined by the light-receiving regions of the light-receiving sensor 2, the validation checking unit 7 determines whether or not the distance to the target 3 is within the measuring range.

The distance range setting unit 9 may be configured to select the delay period Td from different time periods and send the selected delay period Td to the delay controller 8. The delay controller 8 is configured to delay the reference timing signal by the delay period Td received from the distance range setting unit 9 to create the timing signal. In brief, when the distance range setting unit 9 is configured to select the delay period, the measuring range can be varied in conformity with the delay period selected by the distance range setting unit 9. Therefore, the measuring range of the distance measuring device can be expanded.

For example, the chip duration Tc is 100 [ns], and the delay period Td is selected from three different time periods 0 [s], 75 [ns], and 150 [ns]. The measuring range in conformity with the delay period Td=0 [s] is from 0 to 15 [m]. The measuring range in conformity with the delay period Td=75 [s] is from 11.25 to 26.25 [m]. The measuring range in conformity with the delay period Td=150 [s] is from 22.5 to 37.5 [m]. Switching the measuring ranges (delay periods Td) enables to perform distance measurement for various targets 3 located in the different distances.

The distance range setting unit 9 may be configured to automatically switch the measuring ranges (delay periods Td) every time a predetermined number of frames elapses. The predetermined number of the frames may be two or more. In a condition where the predetermined number of the frames is one, the distance range setting unit 9 may switch the delay periods Td cyclically (such that the delay period Td increases or decreases gradually). This arrangement enables to smoothly track the target 3 even when the target 3 moves near the boundary (upper limit or lower limit) of the measuring range. In this arrangement, the distance range setting unit 9 provides instructions to the delay controller 8 such that the delay periods available for the delay controller 8 are cyclically switched.

Further, the distance measuring device may include an event detector 10 configured to determine whether or not a predetermined event occurs. For example, the event detector 10 detects the moving target 3 such as a human with reference to the distance image created by the distance calculator 6. Further, the event detector 10 functions as a prediction means configured to make prediction of a destination of the moving target 3. The event detector 10 provides a result of the prediction to the distance range setting unit 9. The distance range setting unit 9 selects the delay period Td in response to instructions from the event detector 10. In a situation where the target 3 exists near the border between the adjacent measuring ranges (the target 3 exists in a region in which the adjacent measuring ranges overlap), the distance range setting unit 9 selects one from the adjacent measuring ranges on the basis of the result of the prediction of the event detector 10. In this situation, the distance measuring device can track the target 3 and switch the measuring ranges in association with the distance to the target 3. In brief, the distance measuring device can track the target 3 and determine the distance to the target 3.

The distance calculator 6 is configured to calculate the corrected distance value with respect to each of the measuring ranges. In brief, the distance calculator 6 is configured to create the distance image with respect to each of the measuring ranges. For example, when the delay period Td is selected from the three different time periods of 0 [s], 75 [ns], and 150 [ns], the distance image is created with respect to each of the delay periods Td (measuring ranges). In detail, the distance calculator 6 creates the distance image regarding the measuring range of 0 to 15 [m], the distance image regarding the measuring range of 11.25 [m] to 26.25 [m], and the distance image regarding the measuring range of 22.5 [m] to 37.5 [m].

In the real space, each light-receiving region of the light-receiving sensor 2 receives the reflection light from only the single target 3. Irrespective of variation of the measuring range, the single group of the light-receiving regions is corresponding to only the single distance value. Therefore, only the reflection light from the nearest target 3 to the light-receiving sensor 2 in the target space comes into the light-receiving region. In other words, even when the targets 3 are arranged in line, only the light reflected from the nearest target 3 to the distance measuring device comes into the light-receiving region.

Even when the plural measuring ranges (i.e., delay periods) are provided, it is sufficient to associate only the single distance with each group of the light-receiving regions of the light-receiving sensor 2. Preferably, the distance calculator 6 is configured to associate the distance values calculated for each measuring range with the corresponding pixel of the distance image, thereby creating the single distance image (synthetic distance image) by use of the distance values obtained from each of the plural measuring ranges.

In order to synthesize the plural distance images into the single distance image (to create the synthetic distance image), the distance calculator 6 refers to the result of the determination of the validation checking unit 7, and synthesizes only the distance values each corresponding to the distance to the target 3 which is determined to be within the measuring range. Further, a value indicative of an unmeasurable distance is given to the pixel (the pixel indicating the distance greater than the maximum measuring distance or less than the minimum measuring distance) which the validation checking unit 7 determines to see an abnormal value with respect to each of the measuring ranges. In brief, the distance calculator 6 is configured to synthesize the plural distance images into the synthetic distance image in a manner to reduce the number of the pixels having the invalid pixel value.

With this arrangement, it is possible to measure the distance to the object in a seamless manner from within a short range to a long range, yet leaving the user unconscious of the measuring ranges. As described hereinbefore, for determination of the distance around the boundary between the measuring ranges, it is preferred to select one having less error from the distances measured respectively with regard to the measuring ranges across the boundary. In this regard, it may be feasible to determine the distance an average or weighted average of the two distances measured across the boundary.

The measurement accuracy of the distance measuring device may fluctuate due to rounding of the waveform of the modulation signal or the timing signal, even when the distance to the target 3 is within the measuring range.

Figure 8:
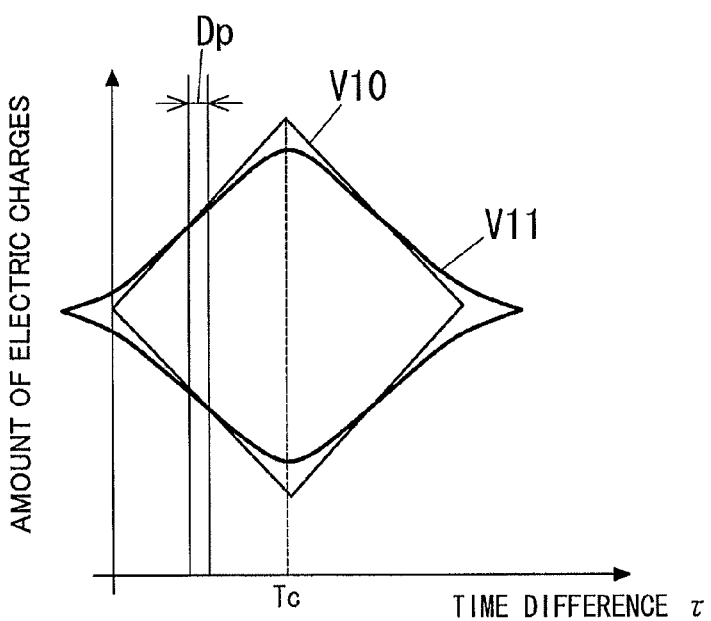
FIG. 8 is an explanatory diagram illustrating the operation of the above distance measuring device.

Due to capacitance or inductance component inherent to the circuit, the modulation signal or the timing signal may not take a regular square wave from. As shown in FIG. 8, in a region where the amounts A0 to A3 of the electric charges are relatively small, and a region where the amounts A0 to A3 of the electric charges are relatively large, an error may be observed between a theoretical value (characteristic line V10) and a realistic value (characteristic line V11) of each of the amounts A0 to A3 of the electric charges. Although FIG. 8 illustrates the amounts A1 and A3 of the electric charges, a similar error may be observed regarding the amounts A0 and A2 of the electric charges. According to the instance shown in FIG. 8, in the region where the amounts A0 to A3 of the electric charges are relatively large, the realistic value is less than the theoretical value. In the region where the amounts A0 to A3 of the electric charges are relatively small, the realistic value is greater than the realistic value. Different from the theoretical value, the realistic value varies along an S-shaped curve rather than a straight line.

Figure 9:
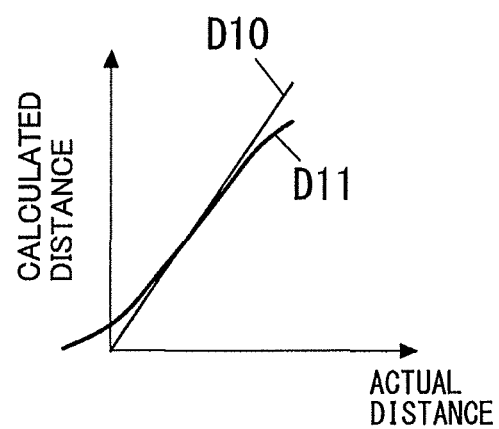
FIG. 9 is an explanatory diagram illustrating the operation of the above distance measuring device.

As described in the above, the distance may not vary linearly with respect to each of the amounts A0 to A3 of the electric charges. Therefore, as shown in FIG. 9, a gap may be observed between a calculated distance (characteristic line D10) and an actual distance (characteristic line D11). However, with respect to each of the amounts A0 to A3 of the electric charges, the line indicative of the realistic value has a region which exhibits the substantively same gradient as that of the theoretical value. Accordingly, it is possible to reduce the error between the calculated distance and the actual distance by making the use of the amounts A0 to A3 of the electric charges within the region where the theoretical value and the actual value have the same gradient.

When the delay period is 0 [s] (the minimum measuring distance is 0 [m]), a distance range (optimal range) within which a degree of coincidence between the gradient of the theoretical value and the gradient of the actual value is relatively high is from "x" to "x+a" [m]. When the delay period is a predetermined value and the minimum measuring distance is "y" [m], the optimal range is from "x+y" to "x+y+a" [m].

The optimal range of "x" to "x+a" [m] is defined as a range within which an error between the actual distance and the calculated distance is not greater than a predetermined value (e.g., 10%). In many situations, the optimal range of "x" to "x+a" [m] exists near the center of the measuring range determined by the chip duration Tc. Accordingly, a range near the center of the measuring range is adopted as an adoption range DP (see FIG. 8) used for distance measurement. With this arrangement, the distance measurement can be performed with improved linearity (high accuracy).

The distance measuring device may have the plural measuring ranges for using only the distance included in a range near the center of the measuring range. In this instance, the distance calculator 6 is configured to create the single distance image (synthetic distance image) on the basis of the distances in the adoption range Dp with respect to each of the measuring ranges. With this arrangement, individual variation of measurement accuracy with respect to each of the distance values can be reduced. Therefore, the distance to the target 3 can be measured with high accuracy.

In the target space, multiple reflection of the light emitted from the light source 1 may occur. When the multiple reflection of the light occurs, the amount of the electric charges generated by a multiple reflection component of the light may be added to the amount of the electric charges generated by a specular reflection component of the light. Thus, the generated amount of the electric charges may be greater than the actual amount of the electric charges. For example, the amount of the electric charges at the time T1 may be added the amount of the electric charges at the time T2 after the time T1 to. When the multiple reflection occurs, the proper amount of the electric charge can not be obtained due to effects of the multiple reflection. Thus, the measured distance may be greatly different from the actual distance.

In view of the above, the distance calculator 6 may be configured to determine, with respect to each of the pixels, whether or not the distance to the target 3 is identical to a predetermined distance, and differentiate the pixel value of the pixel corresponding to the distance L to the target 3 identical to the predetermined distance and the pixel value of the pixel corresponding to the distance to the target not identical to the predetermined distance. For example, the distance calculator 6 selects the valid pixel value as the pixel value of the pixel corresponding to the distance to the target 3 which is equivalent to the predetermined distance, and selects the invalid pixel value as the pixel value of the pixel corresponding to the distance to the target which is not equivalent to the predetermined distance.

The predetermined distance is defined as a distance determined by the flight time Tf when the amount of the electric charges associated with the non-inverted reference timing signal first becomes equivalent to the amount of the electric charges associated with the inverted reference timing signal after an elapse of the delay period Td from when the light source 1 emits the light. The wording "the distance to the target 3 is identical to the predetermined distance" means that the distance to the target 3 is identical to the predetermined distance in a strict sense, and further means that the distance to the target 3 is identical to a distance free from the effects of the multiple reflection.

The following explanation is made to an instance where the distance calculator 6 calculates the distance L to the target 3 with reference to the amounts A0 and A2 of the electric charges. When the delay period Td is (2/3)Tc, the flight time Tf at which the amount A0 of the electric charges first becomes identical to the amount A2 of the electric charge is "Td+Tc". The distance determined by this flight time "Tf=Td+Tc" is equal to the maximum measuring distance Lmax [m]. In this instance, the maximum measuring distance Lmax is 25 [m].

When the time difference $\tau$ exceeds the single chip duration Tc (the distance to the target 3 is greater than the maximum measuring distance Lmax), each of the amounts A0 and A2 of the electric charges is a constant value of "B" (see FIG. 4).

The distance calculator 6 calculates the distance to the target 3 on the basis of the amount of the electric charges corresponding to the maximum measuring distance Lmax. Therefore, irrespective of each of the first timing signal and the second timing signal, the amount of the electric charges resulting from the multiple reflection of light is "B". In brief, the amounts A0 and A2 of the electric charges corresponding to the maximum measuring distant Lmax are added with the same amount of the electric charge developed by the multiple reflection of light. Therefore, with the use of the amounts A0 and A2 of the electric charges corresponding to the maximum measuring distance Lmax, it is made to measure the distance to the target 3 without suffering from the effects of the multiple reflection of the light emitted from the light source 1.

In the above instance, the measuring range determined by the delay period Td includes only the maximum measuring distance Lmax [m]. When an acceptable value regarding a difference between paths of the specular component and the multiple reflection component of the light is DA [m] and the acceptable value is defined as a distance free from the effects of the multiple reflection, the minimum measuring distance Lmin can be determined by a relation: Lmin=Lmax−DA. In brief, the measuring range can be from the minimum measuring distance Lmin=Lmax−DA to the maximum measuring distance Lmax [m]. For example, DA=0.5 [m] and Lmax=25 [m], the measuring range is from 24.5 [m] to 25 [m].

With the configuration of increasing the delay period Td stepwise by a time period corresponding to the acceptable value DA [m], it is enabled to obtain the synthetic distance image free from the effects of the multiple reflection. For example, in a condition where the chip duration Tc is 100 [ns] and DA=0.5 [m], the synthetic distance image having the measuring range of 10 [in] to 25 [m] can be obtained by increasing the delay period Td from (2/3)Tc (corresponding to 10 [m]) to (49/30)Tc (corresponding to 24.5 [m]) by steps of (1/30)Tc (corresponding to 0.5 [m]). As described in the above, one measuring range may be overlapped with another measuring range. In other words, the delay period Td may be increased by steps of a time period less than the time period corresponding to the acceptable value DA [m].

Ideally, the light emitted from the light source 1 is reflected from the target 3 closest to the light-receiving sensor 2, and returns back to the light-receiving sensor 2. However, there may a situation where a piece of glass is placed between the light-receiving sensor 2 and the target 3 closest to the light-receiving sensor 2, or an object with high reflectance is placed close to the light-receiving sensor 2. In such situation, an extra amount of electric charges (close range component of light, or flare component) is developed by the light reflected from the object closer to the light-receiving sensor 2 than the target 3, and is added to the amount of the electric charge developed by the light reflected from the target 3, thus producing a more amount of the electric charge than the actual amount of the electric charge. For example, the amount of the electric charges given at time T1 may be added with the amount of the electric charges given at time T3 preceding time T1. Thus, the measured distance may be greatly different from the actual distance. Especially, since the close range component of the light has a strong intensity, the resulting distance image may suffer from flare.

In view of the above, the distance calculator 6 may be configured to calculate the time difference $\tau$ by use of the amount A1 of the electric charges corresponding to the third reference timing signal (delayed non-inverted reference timing signal) and the amount A3 of the electric charges corresponding to the fourth reference timing signal (delayed inverted reference timing signal).

When the time difference $\tau$ is less than 0, that is, within the delay period Td (the distance to the target 3 is less than the minimum measuring distance Lmin), each of the amount A1 of the electric charges corresponding to the third reference timing signal (third timing signal) and the amount A3 of the electric charges corresponding to the fourth reference timing signal (fourth timing signal) is the constant value of "B".

Therefore, irrespective of each of the third timing signal and the fourth timing signal, the amount of the electric charges corresponding to the close range component is "B". In brief, the amounts of the electric charges which are corresponding to the close range component of the light and respectively added to the amounts of the electric charges respectively corresponding to the third and fourth timing signals are equivalent to each other. Therefore, using a difference between the amounts A1 and A3 of the electric charges for calculating the distance can remove the bad effects caused by the close range component of the light emitted from the light source 1.

With the use of the amounts A1 and A3 of the electric charges, and with the use of the delay period Td selected in such a manner that the close range component of the light comes into the light-receiving sensor 2 within the delay period Td, it is made to measure the distance to the target 3 without suffering from the bad effects of the close range component of the light emitted from the light source 1.

As described in the above, the distance measuring device of the present embodiment includes the light source 1, the light-receiving sensor 2, the timing controller 5, the distance calculator 6, and the delay controller 8.

The light source 1 is configured to emit the light to the target space in which the target 3 exists.

The light-receiving sensor 2 includes the photoelectric converter and the charge accumulator. The photoelectric converter is configured to receive the light from the target space within the reception time period and produce the amount of the electric charges corresponding to the intensity of the received light. The charge accumulator is configured to accumulate the electric charges generated by the photoelectric converter over the predetermined accumulation time period longer than the reception time period.

The timing controller 5 is configured to output the modulation signal to the light source 1 and is configured to output plural reference timing signals to the delay controller 8.

The modulation signal is defined as a square wave signal having high and low level periods appearing alternately, each of the high and low level periods having its length randomly selected from integral multiples of a predetermined unit time period. The plural reference timing signals include a non-inverted reference timing signal having the same waveform as that of the modulation signal, and an inverted reference timing signal which is an inverted one of the non-inverted reference timing signal. In the aforementioned instance, each of the first reference timing signal and the third reference timing signal is defined as the non-inverted reference timing signal. The second reference timing signal is defined as the inverted reference timing signal which is paired with the first reference timing signal. The fourth reference timing signal is defined as the inverted reference timing signal which is paired with the third reference timing signal.

The light source 1 is configured to vary an intensity of the light in concordance with the modulation signal received from the timing controller 5. In the aforementioned instance, the light source 1 is kept turned on while the modulation signal has its signal value of the high level (first value). The light source 1 is kept turned off while the modulation signal has its signal value of the low level (second value).

The delay controller 8 is configured to delay the plural reference timing signals received from the timing controller 5 by the predetermined delay period Td to create plural timing signals respectively, and output the plural timing signals to the light-receiving sensor 2 (photoelectric converter).

The light-receiving sensor 2 (photoelectric converter) is configured to select, as the reception time period, one of high and low level periods of the timing signal received from the delay controller 8. In the aforementioned instance, the light-receiving sensor 2 selects, as the reception time period, the period within which the signal value of the timing signal is kept the high level. The light-receiving sensor 2 may select, as the reception time period, the period within which the signal value of the timing signal is kept the low level.

The light-receiving sensor 2 (charge accumulator) is configured to accumulate the electric charges generated by the photoelectric converter in association with the corresponding timing signals with regard to each of plural timing signals.

The distance calculator 6 is configured to calculate the time difference $\tau$ with reference to the amounts of the electric charges respectively associated with the timing signals. The distance calculator 6 is configured to calculate the distance to the target 3 on the basis of the calculated time difference $\tau$ and the delay period Td. The time difference $\tau$ is defined as a time difference between the delay period Td and the flight time Tf. The flight time Tf defines a time period necessary for the light-receiving sensor 2 (photoelectric converter) to receive the light emitted from the light source 1 and then reflected from the target 3.

In the distance measuring device of the present embodiment, the amount of the electric charges accumulated over the accumulation time period is expressed as a linear function of the time difference $\tau$ which is varied in accordance with the distance to the target 3. The time difference $\tau$ can be determined by use of the amounts of the electric charges accumulated respectively corresponding to the plural different timing signals. Therefore, the distance to the target 3 can be calculated.

The distance calculator 6 calculates the distance to the target 3 by use of the time difference $\tau$ calculated with reference to the amounts of the electric charges and the delay period Td of the delay controller 8. The resolution of the distance measurement is determined by the reference timing signals. The maximum measuring distance is determined by the unit time period and the delay period Td. Therefore, the resolution of the distance measurement can be kept constant irrespective of change in the maximum measuring distance. The distance measuring device varies the upper limit and the lower limit of the measuring range by varying the delay period without varying the unit time period. That is, the distance measuring device varies the upper limit and the lower limit of the measuring range without varying the width of the measuring range. Therefore, the variation of the maximum measuring distance causes no decrease of the resolution of the distance measurement.

The width of the measuring range is determined by the unit time period, and the lower limit of the measuring range is determined by the delay period. The distance calculator 6 is configured not to measure the distance to the target 3 which is out of the measuring range. Accordingly, even when the maximum measuring distance is varied, the distance calculator 6 does not determine the distance to the target which is out of the measuring range.

Further, the desired measuring range is selected only by adjusting the delay period Td. In brief, since the width of the measuring range is determined by the unit time period, the upper limit and the lower limit of the measuring range can be determined by the delay period. Accordingly, the proper measuring range can be selected for measuring the desired distance.

In a preferred aspect, the plural reference timing signals include the first reference timing signal identical to the modulation signal, the second reference timing signal defined as a signal obtained by inversion of the first reference timing signal, the third reference timing signal having the same waveform as that of the modulation signal and delayed from the modulation signal by the unit time period (single chip duration Tc), and the fourth reference timing signal defined as a signal obtained by inversion of the third reference timing signal. The distance calculator 6 is configured to calculate the time difference $\tau$ by use of the amount A0 of the electric charges corresponding to the first reference timing signal, the amount A1 of the electric charges corresponding to the second reference timing signal, the amount A2 of the electric charges corresponding to the third reference timing signal, and the amount A3 of the electric charges corresponding to the fourth reference timing signal.

Therefore, the distance can be measured without suffering from the effects of the environment light even when the environment light (light in no relation with the light emitted from the light source 1) exists.

The distance calculator 6 is configured to calculate the distance to the target 3 in a manner to add the distance determined by the delay period Td to the distance determined by the time difference $\tau$.

The distance measuring device further includes the distance range setting unit 9. The distance range setting unit 9 is configured to select the delay period Td from different time periods in accordance with the received input signal and send the selected delay period Td to the delay controller 8. The delay controller 8 is configured to delay the reference timing signal by the delay period Td received from the distance range setting unit 9 to create the timing signal.

This configuration enables varying the upper and lower limits of the measuring range without varying the width of the measuring range (while keeping the resolution of the distance measurement).

The distance range setting unit 9 is configured to select the delay period Td in accordance with the received input signal. Therefore, the delay period Td (measuring range) can be varied by use of a switch manipulated by a user, or by means of inputting the input signal to the distance range setting unit 9 from a human sensor. In other words, the measuring range can be varied by the distance range setting unit in cooperation with a predetermined means. For example, the measuring range can be varied in order to track a moving human.

Besides, the distance range setting unit 9 may be configured to select the delay period Td from different time periods automatically and send the selected delay period Td to the delay controller 8.

For example, the distance range setting unit 9 selects the delay period Td from different time periods cyclically (in series). According to this example, the distance measurement can be performed over a wide range, yet leaving the user unconscious of the switching of the measuring ranges. In brief, the measuring range can be expanded substantively.

The distance measuring device includes a plurality of the photoelectric converters. In the aforementioned instance, the light-receiving sensor 2 functions as the plurality of the photoelectric converters. The photoelectric converters are arranged in the common plane to form the imaging area. The distance calculator 6 is configured to create the distance image defined by a plurality of pixels respectively associated with the plurality of the photoelectric converters. The distance calculator 6 is configured to determine whether or not the distance to the target 3 is identical to the predetermined distance with regard to each of the pixels, and differentiate the pixel value of the pixel corresponding to the distance to the target 3 identical to the predetermined distance and the pixel value of the pixel corresponding to the distance to the target 3 not identical to the predetermined distance. The predetermined distance is defined as a distance determined by a difference between time at which the light source 1 emits the light, and time at which the amount of the electric charges associated with the non-inverted reference timing signal first becomes equivalent to the amount of the electric charges associated with the inverted reference timing signal after a lapse of the delay period Td starting from the time at which the light source 1 emits the light. Accordingly, the effects of the multiple reflection component of light can be canceled.

The distance measuring device further includes the event detector 10 configured to determine whether or not a predetermined event occurs in the target space. The distance range setting unit 9 is configured to, upon acknowledging that the event detector 10 determines that the event occurs, select the delay period Td from different time periods in concordance with the distance to the location in the target space at which the event occurs. In this configuration, the distance to the target 3 can be measured by use of the delay period Td which is appropriate to the event occurring in the target space.

The distance measuring device further includes the validation checking unit 7. The validation checking unit 7 is configured to refer to whether or not a relation among the amounts of the electric charges respectively associated with the plural timing signals satisfies the predetermined judgment condition, and make determination of whether or not the distance to the target 3 is within the measuring range.

The distance calculator 6 is configured to create the plural distance images respectively corresponding to the plural delay periods, each of the plural distance images defined by a plurality of pixels respectively associated with the plurality of the photoelectric converters.

The distance calculator 6 is configured to create the distance image with reference to the result of the determination made by the validation checking unit. In more detail, the distance calculator 6 is configured to select the valid pixel value as the pixel value of the pixel corresponding to the distance to the target 3 which is within the measuring range. The valid pixel value denotes the distance to the target 3. The distance calculator 6 is configured to select the invalid pixel value as the pixel value of the pixel corresponding to the distance to the target 3 which is out of the measuring range. The invalid pixel value denotes that the distance to the target 3 is out of the measuring range.

The distance calculator 6 is configured to synthesize the plural distance images into the synthetic distance image in a manner to reduce the number of the pixels having the invalid pixel value.

From the plural distance images respectively corresponding to different measuring ranges can be obtained the single distance image (synthetic distance image) corresponding to the measuring range greater than that of each of the plural distance images. In brief, it is possible to create the distance image having a wide range of the distance values.

With using the distance image free from the bad effects of the multiple reflection component, the synthetic distance image with high accuracy of distance measurement can be obtained.

Preferably, the plural delay periods are selected in such a manner as to make the respective measuring ranges consecutive. This configuration enables to connect the measuring ranges consecutively. Besides, the phrase "the measuring ranges are consecutive" implies that the measuring ranges are considered to be consecutive. Therefore, the measuring ranges may overlap with each other partially, and one measuring range may have the upper limit equivalent to the lower limit of another measuring range. Further, when a difference between the upper limit of one measuring range and the lower limit of another measuring range is judged to be small enough such that the upper limit of the former range is deemed to be equal to the lower limit of the latter range, it is concluded that the two measuring ranges are continuous.

In a preferred aspect, the plural reference timing signals includes the delayed non-inverted reference timing signal which has the same waveform as that of the modulation signal and is delayed from the modulation signal by the unit time period, and the delayed inverted reference timing signal defined as a signal obtained by inversion of the delayed non-inverted reference timing signal. In the aforementioned instance, the third reference timing signal is defined as the delayed non-inverted reference timing signal, and the fourth reference timing signal is defined as the delayed inverted reference timing signal. The distance calculator 6 may be configured to calculate the time difference $\tau$ with reference to the amount A1 of the electric charges corresponding to the delayed non-inverted reference timing signal (third reference timing signal) and the amount A2 of the electric charges corresponding to the delayed inverted reference timing signal (fourth reference timing signal). Accordingly, the distance to the target 3 can be measured without suffering from the bad effects of the close range component of the light emitted from the light source 1.

The invention claimed is:
1. A distance measuring device comprising:
a light source configured to emit light to a target space in which a target exists;
a photoelectric converter configured to receive light from the target space within reception time period and produce an amount of electric charges corresponding to an intensity of the received light;
a charge accumulator configured to accumulate the electric charges generated by said photoelectric converter over a predetermined accumulation time period longer than the reception time period;
a timing controller;
a delay controller; and
a distance calculator, wherein
said timing controller is configured to output a modulation signal to said light source and is configured to output plural reference timing signals to said delay controller,
the modulation signal being defined as a square wave signal having high and low level periods appearing alternately, each of the high and low level periods having its length randomly selected from integral multiples of a predetermined unit time period,
the plural reference timing signals including a non-inverted reference timing signal having the same waveform as that of the modulation signal, and an inverted reference timing signal which is an inverted one of the non-inverted reference timing signal,
said light source being configured to vary an intensity of the light in concordance with the modulation signal received from said timing controller,
said delay controller being configured to delay the plural reference timing signals received from said timing controller by a predetermined delay period to create plural timing signals respectively, and output the plural timing signals to said photoelectric converter,
said photoelectric converter being configured to select, as the reception time period, one of high and low level periods with regard to the plural timing signals received from said delay controller,
said charge accumulator being configured to accumulate the electric charges generated by said photoelectric converter in association with the corresponding to the timing signal with regard to each of the plural timing signals,
said distance calculator being configured to calculate a time difference with reference to amounts of the electric charges respectively associated with the plural timing signals, and calculate a distance to the target on the basis of the calculated time difference and the delay period.

2. The distance measuring device as set forth in claim 1, wherein
the plural reference timing signals include a first reference timing signal identical to the modulation signal, a second reference timing signal defined as a signal obtained by inversion of the first reference timing signal, a third reference timing signal having the same waveform as that of the modulation signal and delayed from the modulation signal by the unit time period, and a fourth reference timing signal defined as a signal obtained by inversion of the third reference timing signal,
said distance calculator being configured to calculate the time difference with reference to amounts of the electric charges respectively associated with the first, second, third, and fourth reference timing signals.

3. The distance measuring device as set forth in claim 1, wherein
said distance calculator is configured to calculate the distance to the target in a manner to add a distance determined by the delay period to a distance determined by the time difference.

4. The distance measuring device as set forth in claim 1, wherein
said distance measuring device further comprises a distance range setting unit,
said distance range setting unit being configured to select the delay period from different time periods in accordance with a received input signal and send the selected delay period to said delay controller, and
said delay controller being configured to delay the reference timing signal by the delay period received from said distance range setting unit to create the timing signal.

5. The distance measuring device as set forth in claim 4, wherein
said distance measuring device includes a plurality of said photoelectric converters,
wherein
said photoelectric converters are arranged in a common plane to form an imaging area,
said distance calculator being configured to create a distance image defined by a plurality of pixels respectively associated with the plurality of said photoelectric converters, each of the pixels having its pixel value,
said distance calculator being configured to determine whether or not the distance to the target is identical to a predetermined distance with regard to each of said pixels, and differentiate the pixel value of the pixel corresponding to the distance to the target identical to the predetermined distance and the pixel value of the pixel corresponding to the distance to the target not identical to the predetermined distance,
the predetermined distance being defined as a distance determined by a difference between time at which said light source emits the light, and time at which the amount of the electric charges associated with the non-inverted reference timing signal first becomes equivalent to the amount of the electric charges associated with the inverted reference timing signal after a lapse of the delay period starting from the time at which said light source emits the light.

6. The distance measuring device as set forth in claim 1, wherein
said distance measuring device further comprises a distance range setting unit,
said distance range setting unit being configured to select the delay period from different time periods and send the selected delay period to the delay controller, and
said delay controller being configured to delay the reference timing signal by the delay period received from said distance range setting unit to create the timing signal.

7. The distance measuring device as set forth in claim 6, wherein
said distance measuring device further comprises:
an event detector configured to determine whether or not a predetermined event occurs in the target space; and
a plurality of said photoelectric converters,
wherein
said photoelectric converters are arranged in a common plane to form an imaging area,
said distance range setting unit being configured to, upon acknowledging that said event detector determines that the event occurs, select the delay period in concordance with a distance to a location in the target space at which the event occurs,
said distance calculator being configured to create a distance image defined by a plurality of pixels respectively associated with the plurality of said photoelectric converters, and each of the pixels having its pixel value corresponding to a distance to the target.

8. The distance measuring device as set forth in claim 6, wherein
said distance measuring device includes a plurality of said photoelectric converters, wherein
- said photoelectric converters are arranged in a common plane to form an imaging area,
- said distance range setting unit being configured to select the plural delay periods defining different measuring ranges,
- said distance calculator being configured to create plural distance images respectively corresponding to the plural delay periods, each of the plural distance image defined by a plurality of pixels respectively associated with the plurality of said photoelectric converters, each of the pixels having its pixel value,
- said distance calculator being configured to select a valid pixel value as the pixel value of the pixel corresponding to the distance to the target which is within the measuring range, the valid pixel value denoting the distance to the target, said distance calculator being configured to select an invalid pixel value as the pixel value of the pixel corresponding to the distance to the target which is out of the measuring range, the invalid pixel value denoting that the distance to the target is out of the measuring range, and
- said distance calculator being configured to synthesize the plural distance images into a synthetic distance image in a manner to reduce the number of the pixels having the invalid pixel value.

9. The distance measuring device as set forth in claim 8, wherein
- the plural delay periods are selected in such a manner as to make the respective measuring ranges consecutive.

10. The distance measuring device as set forth in claim 8, wherein
- said distance calculator is configured to select the valid pixel value as the pixel value of the pixel corresponding to the distance to the target which is identical to a predetermined distance, and to select the invalid pixel value as the pixel value of the pixel corresponding to the distance to the target which is not identical to the predetermined distance,
- the predetermined distance being defined as a distance determined by a difference between time at which said light source emits the light, and time at which the amount of the electric charges associated with the non-inverted reference timing signal first becomes equivalent to the amount of the electric charges associated with the inverted reference timing signal after a lapse of the delay period starting from the time at which said light source emits the light.

11. The distance measuring device as set forth in claim 8, wherein
- said distance measuring device further comprises a validation checking unit,
- said validation checking unit being configured to refer to whether or not a relation among the amounts of the electric charges respectively associated with the plural timing signals satisfies a predetermined judgment condition, and make determination of whether or not the distance to the target is within the measuring range,
- said distance calculator being configured to create the distance image with reference to a result of the determination made by said validation checking unit.

12. The distance measuring device as set forth in claim 1, wherein
- the plural reference timing signals include a delayed non-inverted reference timing signal which has the same waveform as that of the modulation signal and is delayed from the modulation signal by the unit time period, and a delayed inverted reference timing signal defined as a signal obtained by inversion of the delayed non-inverted reference timing signal,
- said distance calculator being configured to calculate the time difference on the basis of the amounts of the electric charges respectively corresponding to the delayed non-inverted reference timing signal and the delayed inverted reference timing signal.

* * * * *